United States Patent
Hanzel

(10) Patent No.: US 8,075,239 B2
(45) Date of Patent: Dec. 13, 2011

(54) CARGO HANDLING DEVICE FOR VEHICLE

(75) Inventor: Andrew J. Hanzel, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 381 days.

(21) Appl. No.: 12/362,699

(22) Filed: Jan. 30, 2009

(65) Prior Publication Data
US 2010/0196132 A1  Aug. 5, 2010

(51) Int. Cl.
*B60P 1/32* (2006.01)
(52) U.S. Cl. ........ 414/470; 414/462; 414/477; 296/26.1
(58) Field of Classification Search .................. 414/470, 414/477–479, 462–466; 296/26.1
See application file for complete search history.

(56) References Cited

U.S. PATENT DOCUMENTS

| | | | | |
|---|---|---|---|---|
| 2,338,955 A * | 1/1944 | Metcalf | ......................... | 414/462 |
| 3,132,755 A * | 5/1964 | Greenslate | .................... | 414/522 |
| 3,430,792 A * | 3/1969 | Grove et al. | .................. | 414/477 |
| 3,720,333 A * | 3/1973 | Vaughn | ......................... | 414/462 |
| 3,921,842 A * | 11/1975 | Campbell | ..................... | 414/462 |
| 4,023,690 A * | 5/1977 | Goode | ......................... | 414/24.5 |
| 4,039,096 A * | 8/1977 | McAllister | .................... | 414/462 |
| 4,685,860 A * | 8/1987 | McFarland | .................... | 414/720 |
| 4,753,567 A * | 6/1988 | Achee, Sr. | .................... | 414/462 |
| 4,934,894 A * | 6/1990 | White | ........................... | 414/462 |
| 5,651,657 A * | 7/1997 | Poindexter | .................... | 414/541 |
| 6,193,124 B1 * | 2/2001 | Brazil et al. | .................. | 224/521 |
| 2002/0154980 A1 * | 10/2002 | Potts | ............................ | 414/462 |
| 2007/0052253 A1 * | 3/2007 | Sturt | ............................ | 296/26.1 |

* cited by examiner

*Primary Examiner* — Gregory Adams
*Assistant Examiner* — Jonathan Snelting

(57) ABSTRACT

A cargo handling device lifts a cargo to and from a cargo floor. A linear track mechanism is mounted on the cargo floor and has an extended position projecting through a vehicle opening. A cargo platform is mounted on the linear track mechanism so that the cargo platform moves between a horizontal stored position overlying the cargo floor and a horizontal extended position deployed through the vehicle opening. A pivot acts between the cargo platform and the linear track mechanism so that upon the cargo platform reaching the horizontal extended position the cargo platform can be pivoted between the horizontal extended position and a generally vertical position in which one end of the cargo platform is adjacent the ground so that a cargo resting on the ground can be positioned against the cargo platform. A restraint is provided for restraining the cargo on the cargo platform.

18 Claims, 4 Drawing Sheets

CARGO HANDLING DEVICE FOR VEHICLE

FIELD OF THE INVENTION

The present invention relates to a cargo handling device for a motor vehicle and more particularly employs a sliding and pivoting cargo platform by which a cargo can be readily lifted into and stored on the cargo floor of the vehicle.

BACKGROUND OF THE INVENTION

It is well known that motor vehicles such as pickup trucks and sport utility vehicles and vans have a cargo floor that is accessible through a vehicle opening. The vehicle opening is typically closed by a tailgate or a hatch or a door, or a pair of doors, which can be opened to allow access to the cargo floor for the placement of cargo onto the cargo floor.

One example of such a cargo is a suitcase. Other examples could be a bag of cement or a bundle of shingles. In each case, it can be unwieldy and strenuous for the vehicle user to lift such a cargo from the ground into the rear of the vehicle for storage on the cargo floor.

It would be desirable to provide a cargo handling device which could readily assist the vehicle user in lifting heavy and unwieldy cargo from the ground up to the height of the cargo floor and into and through the vehicle opening for placement onto the cargo floor.

SUMMARY OF THE INVENTION

A cargo handling device lifts a cargo to and from a horizontal cargo floor that is accessible through a vehicle opening. A linear track mechanism is mounted on the cargo floor and has an extended position projecting through the vehicle opening. A cargo platform has an end facing the vehicle opening and sides that overlie the cargo floor. The cargo platform is mounted on the linear track mechanism so that the cargo platform moves between a horizontal stored position overlying the cargo floor and a horizontal extended position deployed through the vehicle opening. A pivot acts between the cargo platform and the linear track mechanism so that upon the cargo platform reaching the horizontal extended position, the cargo platform can be pivoted between the horizontal extended position and a generally vertical position in which one end of the cargo platform is adjacent the ground and cargo resting on the ground can be positioned against the cargo platform. A restraint is provided for restraining the cargo on the cargo platform.

Further aspects of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
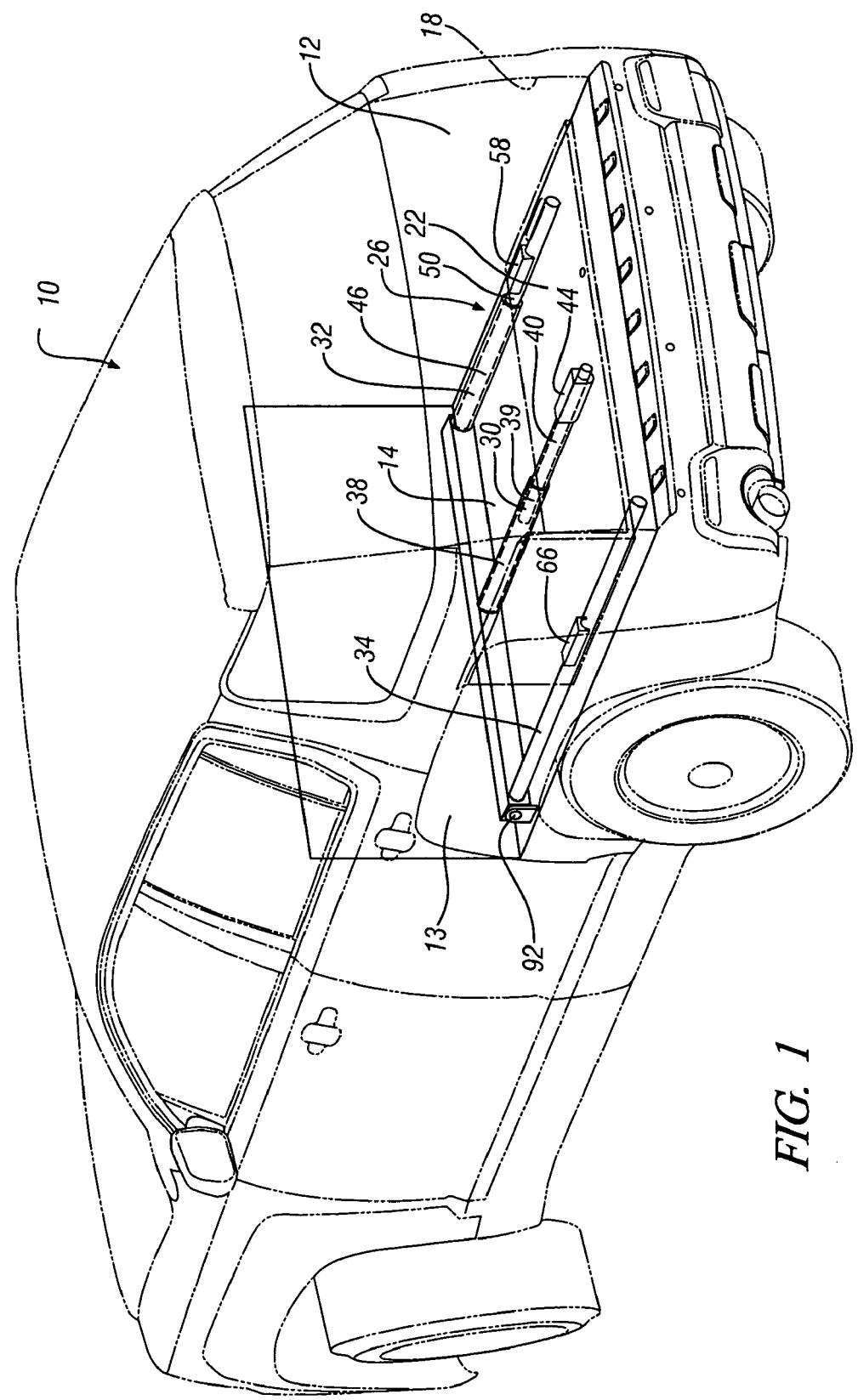
FIG. 1 shows the rear of a motor vehicle having a cargo floor that is accessible through a vehicle opening.

Referring to FIG. 1, it is seen that a vehicle body 10 has side walls 12 and 13 and a conventional cargo floor 14 that extends between the side walls 12 and 13. Cargo floor 14 is accessible through a vehicle opening 18 provided in the vehicle body 10. The vehicle body 10 can be of any known style, such as a sport utility vehicle, a minivan, or a pickup truck. In each case, the cargo floor 14 is generally at the same height as the bottom of the vehicle opening 18. The vehicle opening 18 is conventionally closed by a tailgate, or a lift gate, or doors, not shown in the drawing.

Figure 2:
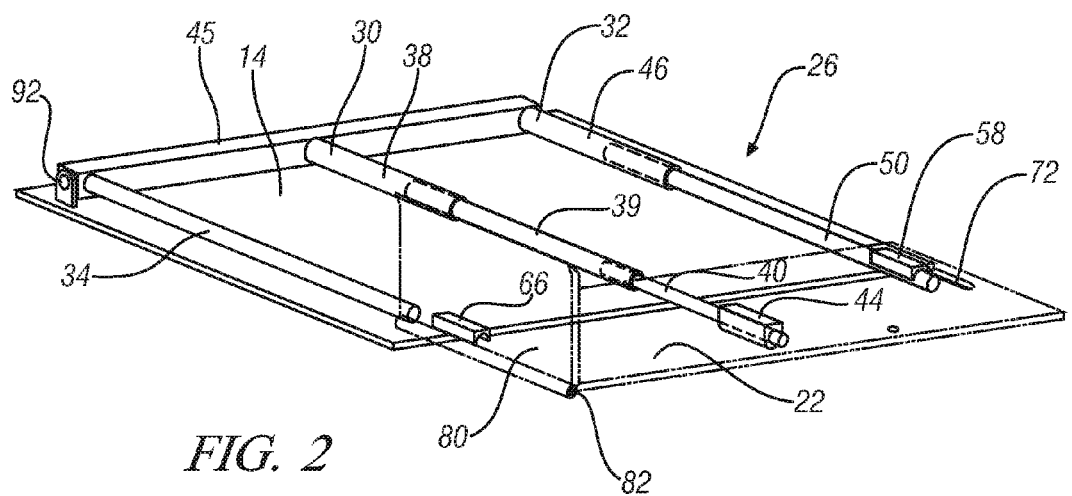
FIG. 2 is a view similar to FIG. 1 but showing the cargo platform having moved to a horizontal extended position in which the cargo platform is deployed rearwardly to extend through the vehicle opening.

The cargo handling device of this invention includes a movable cargo platform 22 which is shown in phantom lines in FIG. 1 and generally overlies a portion of the cargo floor 14. The cargo platform 22 is generally planar in shape and made of rigid plastic or stamped metal panels. As seen in FIGS. 1 and 2 the cargo platform 22 is mounted on the vehicle body 10 by a linear track mechanism, generally indicated at 26, and including a center track assembly 30 and a pair of support or guide track assemblies 32 and 34. This linear track mechanism 26 will support the cargo platform 22 for horizontal sliding movement between a stored position of FIG. 1 and an extended position of FIG. 2.

As best seen in FIG. 2, the center track assembly 30 is located generally at the center of the cargo floor 14 and extends longitudinally within the vehicle body 10. The center track assembly 30 is extendable in length and includes a fixed track 38 that is attached to the cargo floor 14 by a mounting bracket 45, an intermediate track 39 that is slidable relative to the fixed track 38, and a slidable track 40 that slides relative the intermediate track 39. Thus the track portions 38 and 39 and 40 cooperate to define a telescoping arrangement in which the slidable track 40 can be extended outwardly of the vehicle opening 18, as will be discussed hereinafter. The track portions 38, 39, and 40 can be metal tubes that telescope together, or more complex shapes with rollers or polytetrafluoroethylene (PTFE) slides, or other telescoping arrangements that are known in the prior art.

Figure 3:
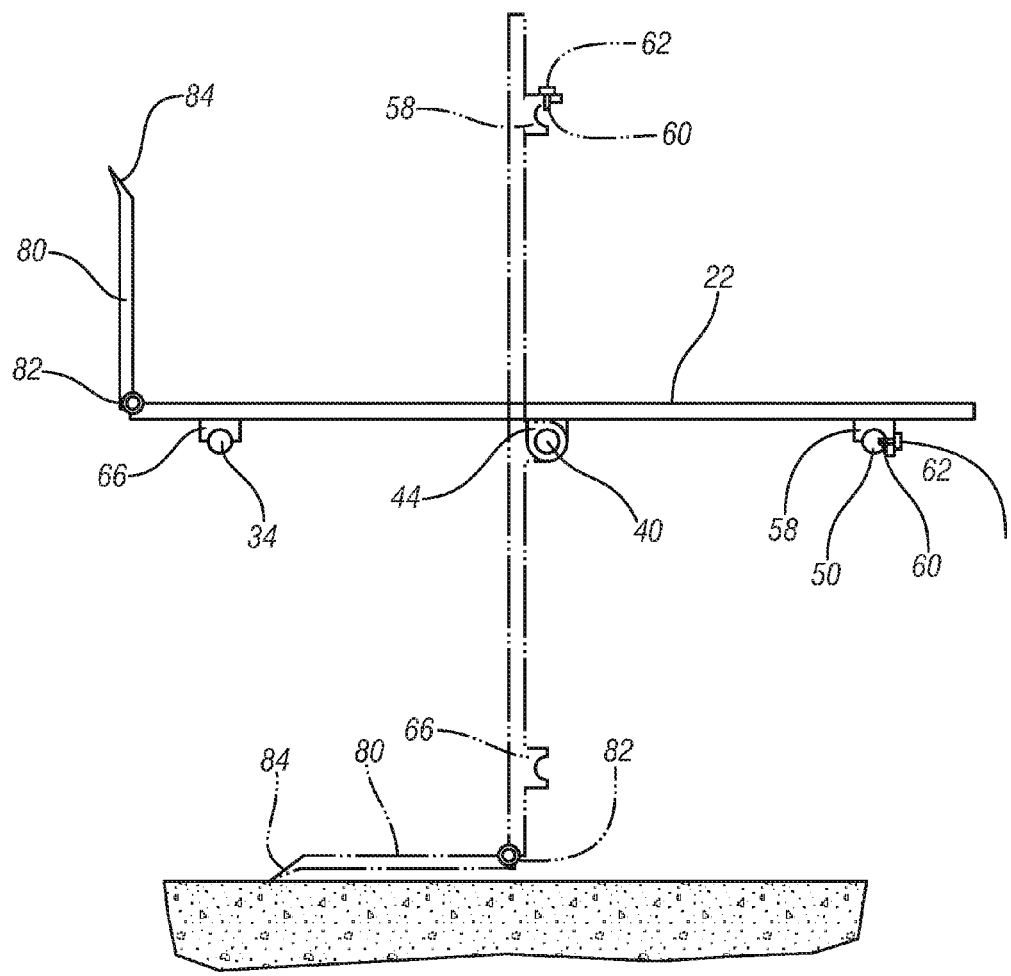
FIG. 3 is an end view taken of the device of FIG. 2.

As best seen in FIGS. 2 and 3, the cargo platform 22 is pivotally mounted on the end of the slidable track 40 by a pivot 44. The pivot 44 can be a bracket that is attached to the underside of the cargo platform 22 and having a bore that encircles the slidable track 40. Thus, as seen in FIG. 3, after the cargo platform 22 is moved rearward beyond the vehicle opening 18 and the rear bumper, the cargo platform 22 can be pivoted from the horizontal position shown in solid line, to a generally vertical position shown in phantom line. This pivoting action occurs about an axis of rotation that extends longitudinally of the vehicle body 10. It is also seen that this axis of rotation is generally in the center of the width of the cargo platform 22 as seen in the drawings.

Figure 6:
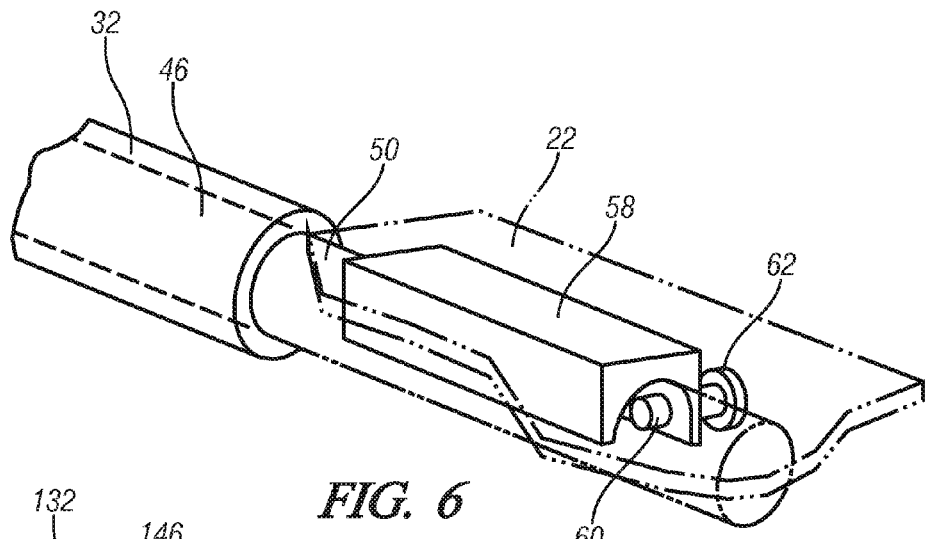
FIG. 6 is an enlarged fragmentary view showing the releasable connection between an extendable guide track and a track follower mounted on the cargo platform.

Referring again to FIG. 2, it is seen that the guide track 32 is comprised of an outer track 46 and an inner track 50 which can be as simple as two pieces of round pipe with the outer track 46 attached to the vehicle by the mounting bracket 45. The inner track 50 is slideable within the outer track 46. Referring to FIG. 6 it is seen that the cargo platform 22 has a track follower 58 attached to the underside thereof and capturing the outside of the inner track 50. A latch 60 is provided between the inner track 50 and the track follower 58, and includes a spring loaded plunger 62 mounted on the track follower 58 and extending into a hole in the inner track 50. Thus, the cargo platform 22 is latched to the track assembly 32 so that the cargo platform will not pivot unexpectedly about the pivot 44 when the cargo platform 22 is moved to its horizontal extended position, as shown in FIGS. 2 and 3.

The guide track 34 is a rod or pipe that is mounted on the mounting bracket 45. The cargo platform 22 carries a track follower 66 that rests upon and slides along the guide track 34 to support weight of the cargo platform 22. As best seen in FIG. 2, when the cargo platform 22 is slid full rearward to the horizontal extended position of FIG. 2 the track follower 66 has been extended away from its engagement with the guide track 34.

After the cargo platform has been slid horizontally rearward to the FIG. 2 position, the cargo platform 22 is pivoted toward the vertical position as enabled by releasing the latch 60 so that the track follower 58 can disengage from the inner track 50 of the track assembly 32. For convenience, a handle slot 72 is provided in the end of the cargo platform 22 so that the vehicle user can pivot the cargo platform 22 about the pivot 44 to the vertical position.

Figure 4:
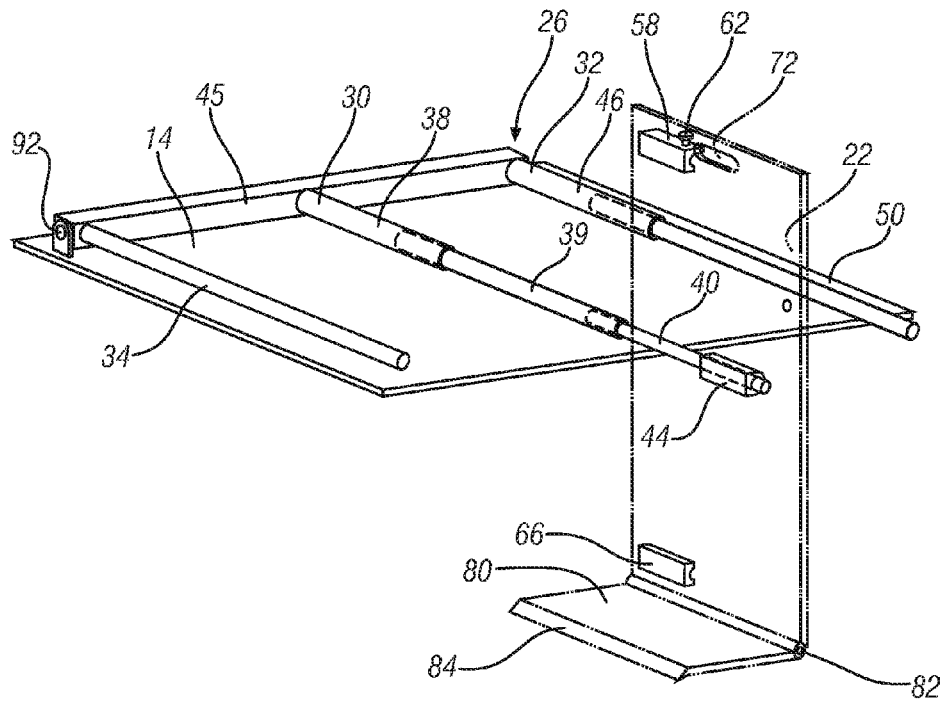
FIG. 4 shows the cargo platform having been pivoted to a vertical position.

As best seen in FIG. 2, a foot gate 80 is mounted on the cargo platform 22 by a pivot 82. The foot gate 80 has a normal use position shown in the drawings wherein the foot gate 80 extends perpendicularly to the plane of the cargo platform 22. Thus, as seen in FIG. 4, when the cargo platform 22 is pivoted to its vertical position about the pivot 44, the foot gate 70 will be resting horizontally on the ground, or if not the foot gate 80 can be pivoted sufficiently so that the chamfered end 84 of the foot gate 80 can be touching the ground.

Figure 5:
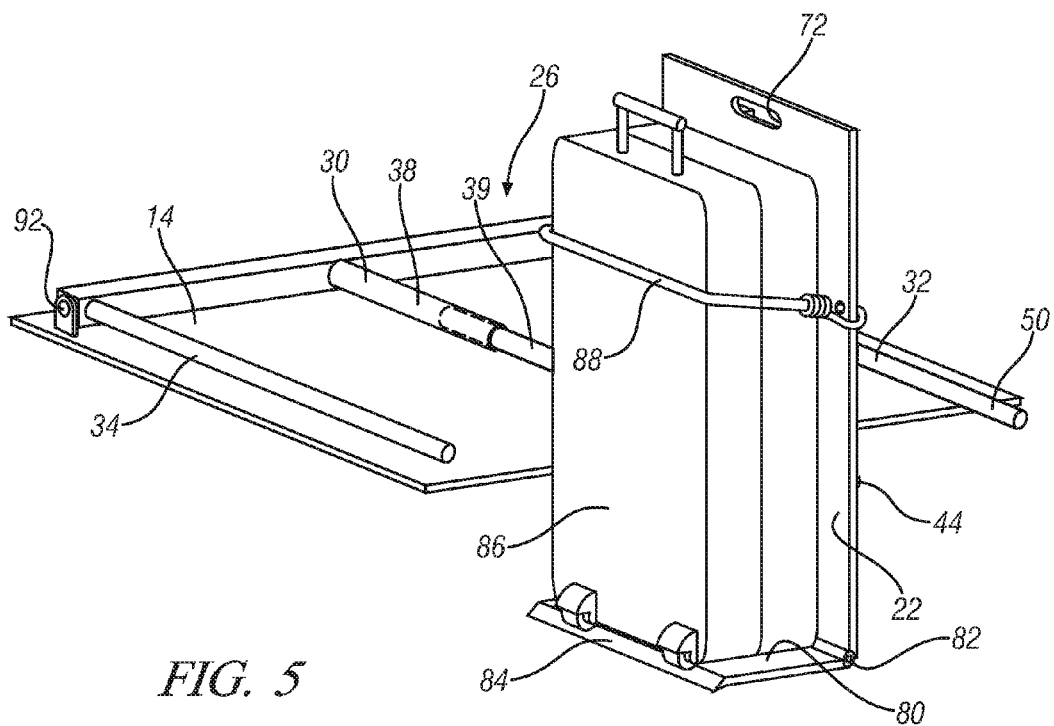
FIG. 5 shows a cargo mounted on the cargo platform and held by a restraint.

Referring to FIG. 5 it is seen that a cargo 86 such as a rolling suitcase has been placed onto the foot gate 80 and rests against the cargo platform 22. A restraint 88, such as one or more elastic cords or equivalent clamping mechanisms, will be employed to restrain the cargo 86 onto the vertically disposed cargo platform 22.

After loading the cargo 86 onto the foot gate 80, the vehicle user will grip the handle slot 72 and pivot the cargo platform 22 from the vertical position of FIG. 5 back to the horizontal position of FIG. 2. Thus, it will be understood that the cargo platform 22 acts as a lever which pivots about the pivot 44 provided on the central track assembly 30 to enable the vehicle user to move the heavy and unwieldy cargo from the ground up to the level of the cargo floor 14. In addition, it will be appreciated that this pivoting movement of the cargo platform 22 will cause the track follower 58 to engage with the inner track 50 of the track assembly 32 and the latch 60 will latch so that the cargo platform 22 will be supported against pivoting back toward the ground. Then the vehicle user will push the cargo platform 22 forwardly from the horizontally extended position of FIG. 2 to the stored position of FIG. 1. As the cargo platform 22 is slid forwardly, the track follower 68 will engage with the support track 34 to assist in supporting the cargo platform 22 and the weight of the cargo 86.

Referring again to FIG. 1, it is seen that the mounting bracket 45 includes a pivot 92. Thus, the entire linear track mechanism 26 and the cargo platform 22 can be lifted about the pivot axis provided by the pivot 92 so that the spare tire stored in a well in the cargo floor can be accessed. In addition, the pivot 92 is preferably a releasable mechanism by which the entire linear track mechanism 26 and the cargo platform 22 can be removed from the vehicle when its use in not wanted.

Figure 7:
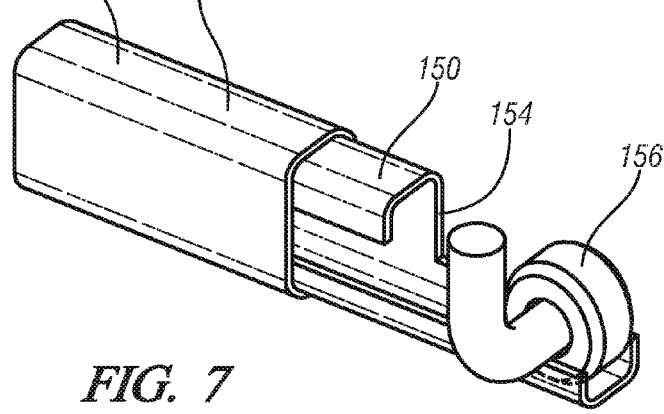
FIG. 7 is an enlarged fragmentary view showing another embodiment of the releasable connection between an extendable guide track and a track follower mounted on the cargo platform.
Figure 8:
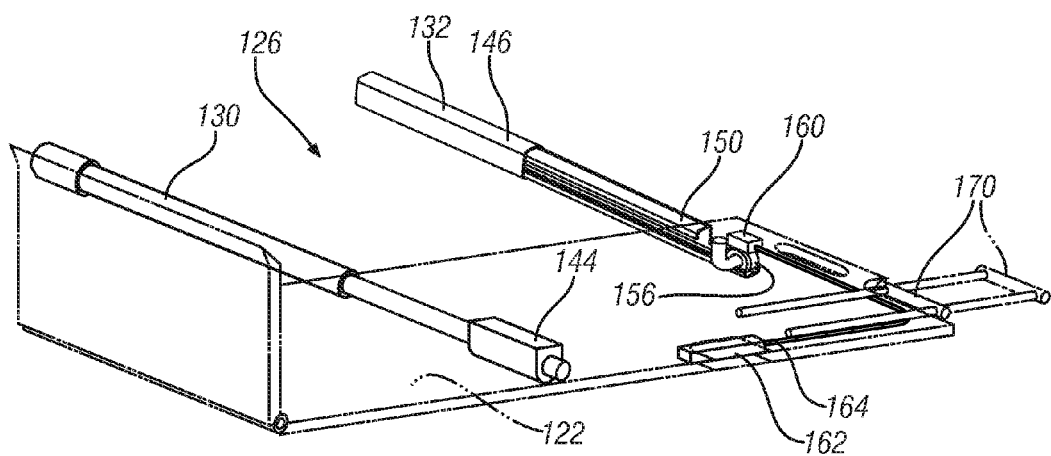
FIG. 8 is a view of a second embodiment of the cargo handling device.

Referring to FIGS. 7 and 8, another embodiment of the invention is shown. As seen in FIG. 8, a cargo platform 122 is mounted on the vehicle by a linear track mechanism 126 that includes a center track assembly 130 and a pivot 144 similar to FIG. 1. A track assembly 132 is formed of C-shaped track sections 146 and 150. The inner track 150 slides within the track section 146. The inner track 150 has an open top slot 154 that receives a roller 156 that will slide into the inner track 150. The roller 156 is attached to the underside of the cargo platform 122. As seen in FIG. 8, a latch bolt member 160 is slidably mounted on the cargo platform 122 and normally extends into engagement with the inner track 150 so that the cargo platform 22 will not pivot about the pivot 144 prematurely. The latch bolt 160 is operated by a handle 162 connected to the latch bolt member 160 by a push pull cable 164 or other connecting mechanism so that the vehicle user can remotely operate the latch member 160 to unlatch from the inner track 150 so that the cargo platform can be pivoted. In addition, FIG. 8 shows an extendible handle 170 that is slidably mounted on the cargo platform 122. By extending the extendible handle 170 to the phantom line indicated position, the vehicle user will have greater leverage in lifting heavier cargo loads.

It will be noticed that FIG. 8 does not show a guide track at the foot of the cargo platform 122. It will be understood that such a guide track is not necessary if the cargo platform is sufficiently rigid to support the weight of the cargo. However, if desired, such a guide track can be utilized and may employ a track assembly similar to the track assembly 132 in which case the tracks will be turned upside down so that the slot 154 would open downwardly so that the roller 156 could swing downwardly from the track assembly as the cargo platform is pivoted downwardly.

Thus, it is seen that the invention provides a cargo handling mechanism by which a vehicle user can readily lift and store a heavy and unwieldy cargo from the ground up into the cargo department of a motor vehicle.

What is claimed is:

1. A cargo handling device for a vehicle user of a vehicle to lift a cargo to and from a horizontal cargo floor that is accessible through a rear vehicle opening comprising:

a cargo platform having an end facing the rear vehicle opening and sides that overlie the cargo floor, in a horizontal position within the vehicle;

a telescoping center track assembly mounted on the cargo floor generally at the center of the cargo floor and extending longitudinally of the vehicle, said center track assembly having an extended position in which a portion of the center track assembly projects through the rear vehicle opening;

a pivot connecting the cargo platform and the portion of the center track assembly that projects through the rear vehicle opening, said pivot having a pivot axis extending longitudinally of the vehicle and located intermediate the sides of the cargo platform and perpendicular to the end of the cargo platform, so that the cargo platform moves through the rear vehicle opening with the portion of the center track assembly that projects through the rear vehicle opening, and so that pivoting movement is permitted of the cargo platform about the pivot axis extending longitudinally of the vehicle at the center of the vehicle between the horizontal position and a vertical position in which one side of the cargo platform is adjacent the ground so that a cargo resting on the ground can be positioned against the cargo platform;

at least one telescoping guide track assembly mounted on the cargo floor and extending longitudinally of the vehicle at one of the sides of the cargo platform, said at least one guide track assembly having an extended position in which at least a portion of the at least guide track assembly projects through the rear vehicle opening;

a latch acting between the cargo platform and the at least one guide track assembly to latch the cargo platform to the at least one guide track assembly so that the cargo platform is supported in the horizontal position and against pivoting about the pivot until the latch is unlatched, and upon unlatching of the latch the cargo platform is permitted to pivot;

a handle provided on the side of the cargo platform opposite the one side of the cargo platform that is adjacent the ground to permit the vehicle user to use the cargo platform as a lever to pivot the cargo platform and a cargo positioned against the cargo platform about the pivot axis extending longitudinally of the vehicle, from the vertical position to the horizontal position in which the cargo platform is again latched to the at least one guide track assembly;

and a restraint for restraining the cargo on the cargo platform.

2. The cargo handling device of claim 1 further comprising a foot gate mounted on the one side of the cargo platform and extending perpendicular to the cargo platform so that upon the cargo platform reaching the generally vertical position the foot gate is horizontal and the cargo may be rested upon the foot gate.

3. The cargo handling device of claim 2 further comprising the foot gate being pivotally mounted on the cargo platform for movement between the position perpendicular to the cargo platform and a stowed position in which the foot gate is folded onto the cargo platform.

4. The cargo handling device of claim 1 further comprising a second guide track assembly mounted on the cargo floor at the other side of the cargo platform from the one side and being selectively engaged by the cargo platform to assist the center track assembly and first guide track assembly in supporting the weight of the cargo platform and the cargo.

5. The cargo handling device of claim 4 further comprising a foot gate pivotally mounted on the one end of the cargo platform for movement between a stowed position folded atop the cargo platform and a use position extending perpendicular to the cargo platform so that upon the cargo platform reaching the generally vertical position the gate is horizontal and the cargo may be rested upon the gate.

6. The cargo handling device of claim 5 further comprising a chamfer provided on the gate so that a cargo can be placed upon the gate and against the cargo platform for restraint by the restraint.

7. The cargo handling device of claim 1 comprising a remote operating handle provided on the cargo platform and operatively connected to the latch so that the vehicle user can unlatch the latch.

8. The cargo handling device of claim 1 further comprising said handle being an extendable handle mounted on the cargo platform and being selectively extendable by the vehicle user to provide additional leverage for pivoting the cargo platform to lift a heavy cargo.

9. The cargo handling device of claim 1 further comprising the center track assembly and the at least one guide track assembly being pivotally mounted on the vehicle floor about an axis extending transversely of the vehicle body so that the center track assembly and the at least one guide track assembly and the cargo platform can be pivotally raised above the cargo floor to enable access to a spare tire well in the cargo floor.

10. A cargo handling device for a vehicle user of a vehicle to lift a cargo to and from a horizontal cargo floor that is accessible through a rear vehicle opening comprising:

a cargo platform having an end facing the rear vehicle opening and sides that overlie the cargo floor, a center track assembly mounted on the vehicle body and having the cargo platform mounted thereon so that the cargo platform moves between a horizontal stored position overlying the cargo floor and a horizontal extended position deployed through the rear vehicle opening;

at least one guide track extending parallel to the center track assembly to support the cargo platform until the cargo platform reaches the horizontal extended position outside the rear vehicle opening;

a pivot with a longitudinal extending pivot axis acting between the cargo platform and the center track assembly , said pivot having a pivot axis extending longitudinally of the vehicle and located intermediate the sides of the cargo platform and perpendicular to the end of the cargo platform, so that upon the cargo platform reaching the horizontal extended position the cargo platform can be pivoted via the pivot between the horizontal extended position and a generally vertical position in which one side of the cargo platform is adjacent the ground so that a cargo resting on the ground can be positioned against the cargo platform;

a latch acting between the cargo platform and the at least one guide track assembly to latch the cargo platform to the at least one guide track assembly so that the cargo platform is supported in the horizontal position and against pivoting about the pivot until the latch is unlatched, and upon unlatching of the latch the cargo platform is permitted to pivot;

a handle provided on the side of the cargo platform opposite the one side of the cargo platform that is adjacent the ground to permit the vehicle user to use the cargo platform as a lever to pivot the cargo platform and a cargo positioned against the cargo platform about the pivot axis extending longitudinally of the vehicle, from the vertical position to the horizontal position in which the cargo platform is again latched to the guide track assembly;

a foot gate mounted on the one end of the cargo platform and extending perpendicular to the cargo platform so that upon the cargo platform reaching the generally vertical position the foot gate is horizontal and the cargo may be rested upon the foot gate;

and a restraint for restraining the cargo on the cargo platform.

11. The cargo handling device of claim 10 further comprising the foot gate being pivotally mounted on the cargo platform for movement between the position perpendicular to the cargo platform and a stowed position in which the foot gate is folded onto the cargo platform.

12. The cargo handling device of claim 10 comprising a remote operating handle provided on the cargo platform and operatively connected to the latch so that the vehicle user can unlatch the latch to initiate pivoting of the cargo platform.

13. A cargo handling device for a vehicle user of a vehicle to lift a cargo to and from a horizontal cargo floor that is accessible through a rear vehicle opening comprising:
   a cargo platform having an end facing the rear vehicle opening and sides that overlie the cargo floor,
   a center track assembly mounted on the vehicle body at the center of the cargo floor and having the cargo platform mounted thereon so that the cargo platform moves between a horizontal stored position overlying the cargo floor and a horizontal extended position deployed through the rear vehicle opening;
   a first guide track extending parallel to the center track assembly to support the cargo platform until the cargo platform reaches the horizontal extended position outside the rear vehicle opening;
   a pivot acting between the cargo platform and the center track assembly, said pivot having a pivot axis extending longitudinally of the vehicle and located intermediate the sides of the cargo platform and perpendicular to the end of the cargo platform, so that upon the cargo platform reaching the horizontal extended position the cargo platform can be pivoted about the pivot axis extending longitudinally of the vehicle and provided by the center track assembly, between the horizontal extended position and a generally vertical position in which one side of the cargo platform is adjacent the ground so that a cargo resting on the ground can be positioned against the cargo platform;
   a latch mechanism acting between the first guide track and the cargo platform so that the cargo platform will be latched against the pivoting movement until the latch is unlatched;
   a second guide track extending parallel to the center track assembly and the first guide track and provided on the vehicle floor on the opposite side of the center track assembly from the first guide track, said second guide track being engaged by the cargo platform to provide additional support for the cargo platform against pivoting movement until the cargo platform reaches the horizontal extended position;
   a foot gate pivotally mounted on the one end of the cargo platform for movement between a stowed position and a use position extending perpendicular to the cargo platform so that upon the cargo platform reaching the generally vertical position the foot gate is horizontal and the cargo may be rested upon the foot gate;
   and a restraint for restraining the cargo on the cargo platform.

14. The cargo handling device of claim 13 comprising a remote operating handle provided on the cargo platform and operatively connected to the latch so that the vehicle user can unlatch the latch.

15. The cargo handling device of claim 13 further comprising an extendable handle mounted on the cargo platform and being selectively extendable by the vehicle user to provide additional leverage for pivoting the cargo platform to lift a heavy cargo.

16. The cargo handling device of claim 13 further comprising said foot gate pivotally mounted on the one end of the cargo platform for movement between a stowed position folded atop the cargo platform and a use position extending perpendicular to the cargo platform so that upon the cargo platform reaching the generally vertical position the gate is horizontal and the cargo may be rested upon the gate.

17. The cargo handling device of claim 16 further comprising a chamfer provided on the foot gate so that a cargo can be placed upon the foot gate and against the cargo platform for restraint by the restraint.

18. The cargo handling device of claim 13 further comprising the center track assembly and the at least one guide track assembly being pivotally mounted on the vehicle floor about an axis extending transversely of the vehicle body so that the center track assembly and the at least one guide track assembly and the cargo platform can be pivotally raised above the cargo floor to enable access to a spare tire well in the cargo floor.

* * * * *